United States Patent [19]
Ito et al.

[11] Patent Number: 5,927,865
[45] Date of Patent: Jul. 27, 1999

[54] ROLLING APPARATUS

[75] Inventors: Hiroyuki Ito; Koichi Hachiya, both of Kanagawa, Japan

[73] Assignee: NSK Ltd., Tokyo, Japan

[21] Appl. No.: 08/919,326

[22] Filed: Aug. 28, 1997

[30] Foreign Application Priority Data

Aug. 28, 1996 [JP] Japan .................................. 8-227090

[51] Int. Cl.⁶ .................................................. F16C 33/62
[52] U.S. Cl. .......................... 384/492; 384/625; 384/913
[58] Field of Search ................................ 384/492, 569, 384/625, 912, 913

[56] References Cited

U.S. PATENT DOCUMENTS

| | | | |
|---|---|---|---|
| 4,960,643 | 10/1990 | Lemelson | 384/907.1 |
| 5,322,735 | 6/1994 | Fridez et al. | 384/625 X |
| 5,352,046 | 10/1994 | Ward | 384/492 |
| 5,441,024 | 8/1995 | Wietig et al. | 123/188.3 |

*Primary Examiner*—Thomas R. Hannon
*Attorney, Agent, or Firm*—Sughrue, Mion, Zinn, Macpeak & Seas, PLLC

[57] ABSTRACT

A rolling apparatus comprising rolling elements disposed between an outer member and an inner member, the rolling elements rolling along a first contact surface, which is the contact surface of the outer member with the rolling elements, and along a second contact surface, which is the contact surface of the inner member with the rolling elements, wherein a film composed of a nickel-tungsten alloy is formed on at least one of the rolling elements, the first contact surface and the second contact surface, and the film has a thickness of from 2 to 30 μm and a tungsten atom weight ratio of at least 35% by weight. The rolling apparatus has a high corrosion resistance to a strong acid such as hydrochloric acid or sulfuric acid and a strong alkali.

3 Claims, 3 Drawing Sheets

ROLLING APPARATUS

FIELD OF THE INVENTION

The present invention relates to a rolling apparatus used for a semiconductor production apparatus, a chemical pump and the like, and particularly to a rolling apparatus having improved corrosion resistance mainly under a strong acidic environment such as hydrochloric acid or sulfuric acid.

BACKGROUND OF THE INVENTION

In a semiconductor production apparatus, a chemical pump, etc, various rolling apparatus such as rolling bearings, linear guide apparatus, ball screws, etc., have hitherto been used.

These rolling apparatus are fundamentally produced by a steel material such as a bearing steel, a case hardening steel, or a stainless steel. With respect to the rolling apparatus which is brought into contact with a chemical having strong acidicity such as hydrochloric acid or sulfuric acid, a corrosion resisting film such as a nickel-phosphorus film or a chromium film is applied to the surface of the steel-made members constituting the rolling apparatus as described in JP-A-63-18722 and JP-A-63-140120 (the term "JP-A" as used herein means an "unexamined published Japanese patent application"). Alternatively, the rolling apparatus is prepared from a ceramics material in place of the steel material.

However, the conventional rolling apparatus having applied thereon a film such as a nickel-phosphorus film or a chromium film, shows a sufficient corrosion resistance to weak acids and some of strong acids and alkalis, but has a problem that such a film is dissolved with strong hydrochloric acid to cause the corrosion of the metal of the base material such as a stainless steel.

On the other hand, the rolling apparatus composed of a ceramic material shows a strong corrosion resistance to acids and alkalis, but has a problem that the cost thereof is high.

Also, a rolling bearing, in which the whole surfaces of the outer race, the inner race, and the rolling elements are coated, has a problem that when a load is high, the life of the rolling bearing is short. Furthermore, a rolling bearing having the outer race, the inner race, and the rolling elements each made up of a ceramic material shows a strong corrosion resistance to acids and alkalis and has no problem about the durability thereof, but has a problem that the cost is high.

SUMMARY OF THE INVENTION

Accordingly, an object of the present invention is to provide a rolling apparatus having a corrosion resistance capable of enduring the use even under a severe circumstance where a strong acid (in particular, strong hydrochloric acid) is present while keeping the original performance of a rolling apparatus by forming a film of a nickel-tungsten (Ni—W) alloy, which has never been applied to rolling apparatus, on the rolling apparatus in place of a nickel-phosphorus film or a chromium film.

Other object of the present invention is to provide a rolling bearing excellent in the corrosion resistance and the durability by forming thereon a nickel-tungsten (Ni—W) alloy film in place of a nickel-phosphorus film or a chromium film, and using rolling elements composed of silicon nitride or silicon carbide and a cage containing a fluorine resin.

That is, according to a first aspect of the present invention, there is provided a rolling apparatus comprising rolling elements disposed between an outer member and an inner member, the rolling elements rolling along a first contact surface, which is the contact surface of the outer member with the rolling elements, and along a second contact surface, which is the contact surface of the inner member with the rolling elements, wherein at least one of the rolling elements, the first contact surface, and the second contact surface has formed thereon a film which has a thickness of from 2 to 30 $\mu$m and is composed of a nickel-tungsten alloy having a tungsten atom weight ratio of at least 35% by weight.

Also, according to a second aspect of the present invention, there is provided a rolling apparatus which is a rolling bearing comprising an outer race, an inner race, rolling elements, and a cage, wherein the surfaces of the outer race and the inner race have a film which is composed of a nickel-tungsten alloy having a tungsten atom weight ratio of at least 35% and has a thickness of from 2 to 30 $\mu$m, the rolling elements are made up of silicon nitride, silicon carbide or zirconia, and the cage is composed of a material containing a fluorine resin.

Furthermore, a third aspect of the present invention, there is provided a rolling apparatus which is a rolling bearing comprising an outer race, an inner race, rolling elements, and a cage, wherein the surfaces of the outer race and the inner race have formed thereon a film which is composed of a nickel-tungsten alloy having a tungsten atom weight ratio of at least 35% and has a thickness of from 2 to 30 $\mu$m, and a corrosion resisting grease is enclosed in the rolling bearing.

DETAILED DESCRIPTION OF THE INVENTION

Figure 1:
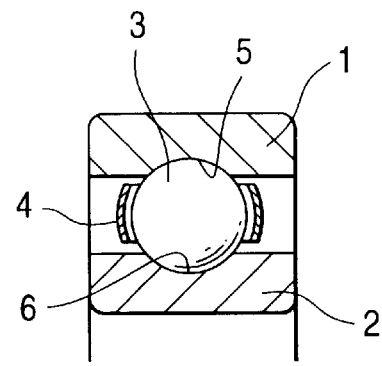
FIG. 1 is a partial cross sectional view of a first embodiment of the rolling apparatus of the present invention.

The present invention is described in detail below.

The outer member of the rolling apparatus of the present invention means an outer race in a rolling bearing, a slider in a linear guide apparatus, and a nut in a ball screw. Also, the inner member in the rolling apparatus means an inner race in a rolling bearing, a guide rail in a linear guide apparatus, and a screw axis in a ball screw.

With respect to the first contact surface which is the contact surface of the outer member with the rolling elements and the second contact surface which is the contact surface of the inner member with the rolling elements, in the case of a rolling bearing, the raceway surface of the outer race is the first contact surface and the raceway surface of the inner race is the second contact surface. In the case of a linear guide, the rolling element rolling groove of the slider is the first contact surface and the rolling element rolling groove of the guide rail is the second contact surface. Furthermore, in the case of a ball screw, the screw groove of a nut is the first contact surface and the screw groove of a screw axis is the second contact surface.

In the rolling apparatus of the present invention, at least one of the rolling elements, the first contact surface, and the second contact surface, which are most severely worn in the rolling apparatus, is provided with a Ni—W alloy film. As the matter of course, the coated members may be all of the rolling elements, the first contact surface, and the second contact surface, and the whole surface of the outer member or the inner member may be coated with the alloy. Furthermore, the whole rolling apparatus may be entirely coated with the alloy.

Since the Ni—W alloy film is not only excellent in the acid resistance and the alkali resistance but also has a high hardness and a wear resistance, a rolling apparatus having a corrosion resistance of a very high reliance can be obtained. In addition, the hardness of the Ni—W alloy film is usually about Hv 600, but the hardness can be more increased to about Hv 1300 by applying a heat treatment to the film. Thus, the Ni—W alloy film is very useful for the improvement of the wear resistance.

The thickness of the Ni—W alloy film is from 2 to 30 μm. If the thickness is thinner than 2 μm, the film is too thin to prevent the formation of pinholes and a liquid such as an acid or an alkali penetrates through the pinholes to corrode the metal of the mother material. On the other hand, if it is thicker than 30 μm, satisfactory corrosion resistance is exhibited, but the members after formation of the film have poor dimensional precision. In order to ensure the precision, re-working is necessary, which takes a great deal of time and results in increased production cost.

The atom weight ratio of tungsten (W) in the Ni—W alloy film is at least 35% by weight. If the atom weight ratio thereof is less than 35% by weight, since the nickel (Ni) component is present in a large amount, the Ni—W alloy film is reluctant to become amorphous and the corrosion resistance, in particular, to a strong acid is insufficient. Also, the upper limit of the tungsten atom weight ratio is preferably as high as possible, but it is difficult to provide a Ni—W alloy having a tungsten atom weight ratio of more than 50% according to the existing technique.

To form the Ni—W alloy film on the rolling apparatus of the present invention, an electrolytic plating method is preferred. The electrolyte to be used for the electrolytic plating contains a nickel salt, a tungstate, and an organic complexing agent which can form a stable complex ion with these metal ions. For example, the electrolytic plating can be effected by using an aqueous solution containing nickel sulfate ($NiSO_4 \cdot 6H_2O$) as the nickel salt, sodium tungstate ($Na_2WO_4 \cdot 2H_2O$) as the tungstate, and citric acid or tartaric acid as the organic complexing agent at a weight ratio of 7:7:10 and having a pH value adjusted to from neutral to weak acidic as an electrolyte and the member to be plated of the rolling apparatus as a cathode at a temperature of from 60 to 80° C. and at a current density of from 8 to 12 $A/dm^2$. Thus, the Ni—W alloy film having a thickness of from 2 to 30 μm and a tungsten atom weight ratio of at least 35% by weight can be preferably formed.

In the case where only a part of the member to be plated of the rolling apparatus is required to be coated with the Ni—W alloy, the plating can be applied after masking the part not to be coated, for example, with a masking agent such as a coating material or a rubber.

Besides the Ni—W alloy film, a rhodium film preferably having a thickness of 0.1 to 10 μm is effective in the corrosion resistance.

In the case of the rolling bearings, ceramics such as silicon nitride, silicon carbide or zirconia, can be used for the rolling elements. Silicon nitride, silicon carbide or zirconia is more excellent in the corrosion resistance than the Ni—W alloy and also is excellent in the wear resistance. Also, the rolling bearing having an outer race and an inner race which are made up of a same material and rolling elements made up of a different material is more excellent in the wear resistance than the rolling bearing having an outer race, an inner race, and rolling elements all made up of a same material. When a ceramic is used for the rolling elements, there is almost no problem on the increase of the cost, but when a ceramic is used for the outer race and the inner race, the cost becomes very high. Also, the cage contains a fluorine resin. The lubrication of the rolling bearing can be effected utilizing the transition film of the fluorine resin transferred from the cage containing the fluorine resin. The transition film of the fluorine resin is excellent in the corrosion resistance (resistance to chemicals), the wear resistance (low dust generation), and the lubricity (durability). Also, there is no particular restriction on the material for the cage, as long as the material is not corroded under a corrosive environment. For example, a stainless steel coated with a Ni—W alloy can be used.

As the lubricant, a corrosion resisting grease is used. Examples of the corrosion resisting grease include a fluorine series grease (fluorine resin-fluorine oil) is used. When an ordinary lithium soap grease, sodium soap grease, etc., is used, a thickener and a base oil are gradually deteriorated, so that the grease becomes unusable. On the other hand, the fluorine series grease is not corroded under a corrosive circumstance.

The formation of the Ni—W alloy film on the outer race and the inner race of the rolling bearing can be effected in the same manner as in the formation of the Ni—W alloy film on the rolling apparatus described above. Also, a masking method for not applying a plating to a part of the member described above can be also applied.

The embodiments of the present invention are described below by referring to the accompanied drawings.

First, as the first embodiment of the present invention, the case of applying the present invention to a rolling bearing is described.

For example, in a chemical pump sending a strong acid such as sulfuric acid, hydrochloric acid, etc., a rolling bearing supporting a pump rotating shaft is required to have a high acid resistance capable of enduring a continuous operation of a long period of time. In this case, the use of a ceramic-made bearing causes no problem about the corrosion resistance, but such a bearing is very expensive.

In the rolling bearing of the present invention, the surfaces of the outer race, the inner race, and the ball (rolling elements), which are the constituting members of the rolling bearing, are coated with a Ni—W alloy.

FIG. 1 is a partial cross sectional view of a single row deep groove ball bearing which is the first embodiment of the rolling apparatus of the present invention, wherein a ball 3, which is a rolling element, is disposed between an outer race 1 which is an outer member and an inner race 2 which is an inner member and is held by a cage 4. A first contact surface which is the contact surface of the outer race 1 with the ball 3 is a raceway surface 5 of the outer race and a second contact surface which is the contact surface of the inner race 2 with the ball 3 is a raceway surface 6 of the inner race. Each member of the outer race 1, the inner race 2, and the ball 3 is composed of a bearing steel and on the surfaces of these members are formed a film of a Ni—W alloy by means of an electrolytic plating method. In the Ni—W alloy film, the tungsten atom weight ratio is at least 35% by weight and on the whole surfaces of the outer race 1, the inner race 2, and the ball 3 are all formed the Ni—W alloy film having a thickness of from 2 to 30 µm. In addition, on the surface of the cage 4 is formed the Ni—W alloy film having a thickness of from 2 to 30 µm and in this case, the tungsten atom weight ratio of the Ni—W alloy film is also at least 35% by weight. The terminology "tungsten atom weight ratio of the Ni—W film" as used herein is defined as (W/(Ni+W))×100 % by weight, wherein W and Ni are the weight of tungsten atom and nickel atom, respectively, contained per the unit weight of the Ni—W film. For example, the weight of each atom contained in the film can be measured by means of an atomic-absorption spectroscopy.

When the corrosion resisting ball bearing protected with the Ni—W alloy film is used for a chemical pump, the ball bearing can exhibit an excellent corrosion resistance even when the ball bearing is brought into contact with a solution having a strong corrosive property such as a strong acid (e.g., sulfuric acid, nitric acid, and particularly hydrochloric acid) or a strong alkali. Also, because the surfaces of the members, which are particularly liable to be corroded, such as the raceway surface 5 of the outer race 1, which is the first contact surface, the raceway surface 6 of the inner race 2, which is the second contact surface, and the surface of the ball 3 are protected with a high-hardness corrosion resisting film excellent in the mechanical characteristics and the corrosion resistance, a continuous operation of a long period of time becomes possible. Also, the corrosion resisting ball bearing protected with the Ni—W alloy film is advantageous in cost as compared with a ceramic-made bearing.

In this case, the whole surfaces of the all members constituting the bearing are not necessarily coated with the Ni—W alloy. For example, the application of the Ni—W alloy film may be limited to a member selected from the outer race 1, the inner race 2, and the ball 3 or the application of the Ni—W alloy film may be limited to specific portions of the members, for example, to the raceway surface 5 of the outer race 1, or the raceway surface 6 of the inner race 2. Furthermore, the ball 3 only is made up of a ceramic and may be used together with the outer race and the inner race each coated with the Ni—W alloy, and thus, other corrosion resisting materials may be used in combination. The thickness of the Ni—W alloy film can be arbitrarily adjusted in the range of from 2 to 30 µm according to the use circumstances and the performance required for the bearing.

In addition, in the above-described embodiment of the present invention, the open-type single row deep groove ball bearing was illustrated as the bearing but the present invention can be similarly applied to a shield-type bearing, a rubber seal-type bearing, etc., as well as ball bearings of other types. Furthermore, the present invention can be applied not only to ball bearings but also to rolling bearings.

Then, as the second embodiment of the present invention, the case of applying the present invention to a linear guide for a linear rolling bearing is shown.

For example, a linear guide for conveying and positioning a wafer which is incorporated in a semiconductor production apparatus is required to have a high corrosion resistance capable of enduring the continuous operation for a long period of time in a corrosive atmosphere such as HCl or $Cl_2$, in a step of hydrochloric acid-washing a wafer or a silicon oxide film-forming step which utilizes a HCl oxidation. In this case, the use of a ceramic as the material of the linear guide has no problem about the corrosion resistance, but such a linear guide is very expensive.

In the linear guide of the present invention, the surfaces of the guide rail, the slider body, and the rolling elements which are constituting members of the linear guide are coated with the Ni—W alloy.

Figure 2:
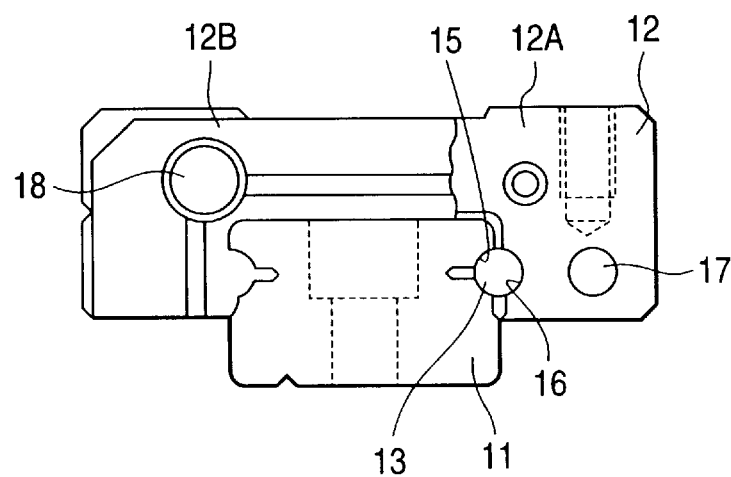
FIG. 2 is a front view showing a second embodiment with parts broken away of the rolling apparatus of the present invention.

FIG. 2 is a front view showing a small-sized linear guide with parts broken away as the second embodiment of the rolling apparatus of the present invention. A slider 12 having U-form cross section, which is an outer member, mounts over a guide rail 11 which is an inner member having an almost square-shaped cross section, and many balls 13, which are rolling elements, are arranged between both the members. In more detail, each of long track grooves 15 is formed at both sides of the guide rails 11 in the axial direction, on the other hand, a rolling element rolling groove 16 is formed at the inner surface of the slider body 12A which is the constituting member of the slider, opposite to the rolling element rolling groove 15, and a rolling element return path 17 composed of a penetrated hole in parallel with the rolling element rolling groove 16 is formed in a sleeve portion. To both ends of the slider body 12A is fitted each of end caps 12B which are constituting members of the slider by means of a screw 18, and a semi-doughnut-form curved path (not shown) connecting the rolling element rolling groove 16 to the rolling element return path 17 is formed at each of the end caps 12B to constitute a circulation passage for the rolling elements 13, namely, the circulation passage is composed of the rolling element rolling groove 16, the rolling element return path 17 and the curved path. In the circulation passage are loaded many rolling elements 13 and they are kept without falling off.

In this case, the first contact surface, which is the contact surface of the outer member 12 with the rolling elements 13, is the rolling element rolling groove 16 at the inside surface of the slider 12, and the second contact surface, which is the contact surface of the inner member 11 with the rolling elements 13, is the rolling element rolling groove 15 at the outer side of the guide rail 11.

Each member of the guide rail 11, the slider body 12A, and the rolling elements 13, which are constituting members of the linear guide, is made of a bearing steel and a Ni—W alloy film is formed on the surface of each member according to an electrolytic plating method. The tungsten atom weight ratio of the Ni—W alloy film is at least 35% by weight and on the whole surface of each of the slider body 12A, the guide rail 11 and the balls 13 of the linear guide described above is formed the Ni—W alloy film having a thickness of from 2 to 30 µm. The end cap 12B is made of a synthetic resin excellent in the acid resistance.

When the linear guide protected with the Ni—W alloy film according to the present invention is used for a semiconductor production apparatus, the linear guide exhibits an excellent corrosion resistance even in a strongly corrosive atmosphere such as hydrochloric acid or chlorine gas. Also, a continuous operation of a long period of time is possible, since the surfaces of the rolling element rolling groove 16 of the slide, which is the first contact surface, the rolling element rolling groove 15 of the guide rail, which is the second contact surface, and the rolling elements 13, which are particularly liable to be corroded, are protected with the film having high hardness and wear resistance which is excellent in the mechanical characteristics and the friction resistance. In addition, the linear guide of the present invention is very advantageous in cost, because an ordinary steel material, which is inexpensive as compared with ceramics, can be used as the materials for the linear guide to be used in a strong corrosive atmosphere.

In the above-described embodiment of the present invention, the Ni—W alloy film is formed on the whole surfaces of the slider body 12A, the guide rail 11, and the balls 13 of the linear guide, but the formation of the Ni—W alloy film may be limited to at least one member selected from the guide rail 11, the slider body 12A, and the rolling elements 13, and also the formation of the Ni—W film may be limited to specific portions of the members, for example, to the rolling element rolling groove 15 of the guide rail 11 or the rolling element rolling groove 16 of the slider 12. Furthermore, the rolling elements 13 may be those made of a ceramic, and thus, other corrosion resisting materials may be used in combination. The thickness of the Ni—W alloy film can be arbitrarily adjusted in the range of from 2 to 30 μm according to the use environment and the performance required for the linear guide.

In addition, the linear guide to which the present invention is applied is not limited to the above-described embodiment, but the present invention can be applied to various linear guides such as a linear guide in which two or more first contact surfaces 16 and two or more second contact surfaces 15 are formed at one side of the linear guide, a linear guide in which the rolling elements are rollers, or a linear guide in which the guide rail has a U-form cross section and a slider is movably disposed via rolling elements in the concaved portion of the inner surface thereof.

Then, as the third embodiment of the present invention, the case of applying the present invention to a ball screw is described below.

For example, a ball screw which is used together with the linear guide for conveying and positioning a wafer in a semiconductor production apparatus is required to have a high corrosion resistance capable of enduring a continuous operation of a long period of time even in a corrosive atmosphere of HCl, $Cl_2$, etc., as well.

In the ball screw of the present invention, the surfaces of a screw axis, a nut, and rolling elements are coated with a Ni—W alloy.

Figure 3:
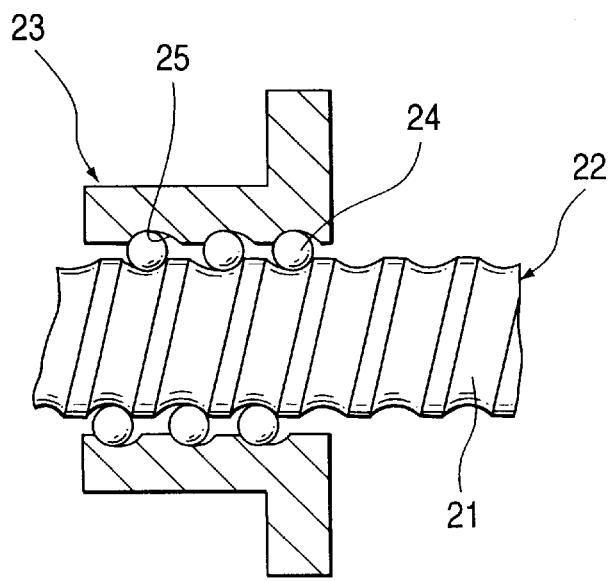
FIG. 3 is a cross sectional view of the essential portion of a third embodiment.

FIG. 3 is a cross sectional view of the essential portion of a ball screw as the third embodiment of the rolling apparatus of the present invention.

As shown in FIG. 3, over a screw axis 22, which is an inner member, having formed on the outer surface thereof a spiral screw groove 21 is fitted a nut 23, which is an outer member, via rolling elements 24 which are composed of many balls. The nut 23 has formed on the inside surface thereof a screw groove 25 corresponding to the screw groove 21 of the screw axis 22. The rolling elements 24 circularly move between both end portions of the nut 23 in the axis direction by induced along a ball circulation passage (not shown) formed at the barrel of the nut 23 while rolling to the rotating direction of the screw axis 22 in the spiral space formed by the above-described screw grooves 21 and 25. Also, the ball screw is constructed such that when the screw axis 22 is rotated, the nut 23 is sent along the screw axis 22 to the linear direction via rolling of the rolling elements 24.

In this case, the first contact surface that the outer member 23 is brought into contact with the rolling elements 24 is the screw groove 25 of the nut 23 and the second contact surface that the inner member 22 is brought into contact with the rolling elements 24 is the screw groove 21 at the outer surface of the screw axis.

Each member of the screw axis 21, the nut 23, and the rolling elements 24, which are constituting members of the ball screw, is made of a bearing steel and the film of a Ni—W alloy is formed on the surfaces of the members. The tungsten atom weight ratio of the Ni—W alloy film is at least 35% by weight and the thickness of the Ni—W alloy film formed on the surface of each member is from 2 to 30 μm.

When the ball screw thus protected with the Ni—W alloy film in the present invention is used for a semiconductor production apparatus, the ball screw shows an excellent corrosion resistance even in a strong corrosive atmosphere such as hydrochloric acid, a chlorine gas, etc. Also, a continuous operation of a long period of time is possible, because the surfaces of the screw groove 21 of the screw axis 22, which is the first contact surface, the screw groove 25 of the nut 23, which is the second contact surface, and the rolling elements 24, which are particularly liable to be corroded, are protected with a film having high hardness and wear resistance, which is excellent in the mechanical characteristics and the friction characteristics. In addition, the ball screw of the present invention is very advantageous in cost, because an ordinary steel material, which is inexpensive as compared with ceramics, can be used as the material for the ball screw to be used in a strongly corrosive atmosphere.

In the above-described embodiment of the present invention, the Ni—W alloy film is formed on the whole surfaces of all the members constituting the ball screw, but, the application of the Ni—W alloy film may be limited to at least one member selected from the screw axis 22, the nut 23, and the rolling elements 24 or the Ni—W alloy film may be limited to specific portions of the member(s) such as the screw groove 21 of the screw axis or the screw groove 25 of the nut 23. Furthermore, the rolling elements 24 may be those made of a ceramic, and thus, other corrosion resisting materials may be used in the combination. Also, the thickness of the Ni—W alloy film can be arbitrarily adjusted in the range of from 2 to 30 μm according to the use circumstance and the performance required for the ball screw.

The ball screw to which the present invention is applied is not limited to the above-described embodiment, and the present invention can be applied to a tube circulation-type ball screw which has a circulating tube of rolling elements, an end cap circulation type ball screw in which a circulation passage is formed at the end cap, a large lead-type ball screw having a large screw lead, and other types of ball screws.

EXAMPLES

A rotary endurance test practiced for confirming the effects of the rolling apparatus of the present invention is described below.

As the rolling apparatus prepared according to the present invention, used were the deep groove ball bearing shown in FIG. 1, the linear guide shown in FIG. 2, and the ball screw shown in FIG. 3, in which a Ni—W alloy film having a thickness of from 2 to 30 μm and a tungsten atom weight ratio falling within the range of from 35 to 50% was formed on the whole surfaces of the outer member, the inner member, and the rolling element(s). With respect to the slider 12, only the slider body 12A was provided with the Ni—W alloy film.

As comparative rolling apparatuses, used were a rolling apparatuses in which a Ni—W alloy film was provided but either the thickness or the tungsten atom weight ratio thereof was outside of the ranges specified according to the present invention, a rolling apparatus in which a nickel-phosphorus film was provided, and a rolling apparatus in which a chromium film was provided.

As a corrosive environment, an aqueous hydrochloric acid solution and an aqueous sodium hydroxide solution were used.

The details of the endurance test are as follows.

Rotary Endurance Test (A)
- Corrosive environment: In 12N hydrochloric acid solution
- Rolling apparatus: Deep groove ball bearing (Designation 608)
- Rotation speed: 60 r.p.m.
- Temperature: 30° C.
- Test time: 24 Hours Rotary Endurance Test (B)
- Corrosive environment: In 10N sodium hydroxide solution
- Rolling apparatus: Deep groove ball bearing (Designation 608)
- Rotation speed: 60 r.p.m.
- Temperature: 30° C.
- Test time: 24 Hours Rotary Endurance Test (C)
- Corrosive environment: In 12N hydrochloric acid solution
- Rolling apparatus: Linear guide (LH250535)
- Speed: 10 mm/second
- Temperature: 30° C.
- Test time: 24 Hours Rotary Endurance Test (D)
- Corrosive environment: In 10N sodium hydroxide solution
- Rolling apparatus: Linear guide (LH250535)
- Speed: 10 mm/second
- Temperature: 30° C.
- Test time: 24 Hours Rotary Endurance Test (E)
- Corrosive environment: In 12N hydrochloric acid solution
- Rolling apparatus: Ball screw (W1503FA)
- Rotation speed: 60 r.p.m.
- Temperature: 30° C.
- Test time: 24 Hours Rotary Endurance Test (F)
- Corrosive environment: In 10N sodium hydroxide solution
- Rolling apparatus: Ball screw (W1503FA)
- Rotation speed: 60 r.p.m.
- Temperature: 30° C.
- Test time: 24 Hours The evaluations after the test were as follows.

A: The surfaces of the rolling apparatus to be tested were not changed and the rotation was smooth.

B: The surfaces of the rolling apparatus to be tested were not changed but the rotation rumbled.

C: The surfaces of the rolling apparatus to be tested were discolored and the rotation rumbled.

Only "A" is rated as "pass".

The results of the rolling apparatuses of the present invention are shown Table 1 below.

TABLE 1

| Test No. | Example 1a | Example 2a | Example 3a | Example 4a |
|---|---|---|---|---|
| Kind of Film | Ni—W | Ni—W | Ni—W | Ni—W |
| Thickness (µm) | 2 | 30 | 20 | 20 |
| W Atom Weight Ratio (%) | 40 | 40 | 35 | 50 |
| Rotary Endurance Test (A) | A | A | A | A |
| Rotary Endurance Test (B) | A | A | A | A |
| Rotary Endurance Test (C) | A | A | A | A |
| Rotary Endurance Test (D) | A | A | A | A |
| Rotary Endurance Test (E) | A | A | A | A |
| Rotary Endurance Test (F) | A | A | A | A |

Also, the results of the rolling apparatuses of the comparative examples are shown in Table 2 below.

TABLE 2

| Test No | C. Ex. 1a | C. Ex. 2a | C. Ex. 3a | C. Ex. 4a | C. Ex. 5a |
|---|---|---|---|---|---|
| Kind of Film | Ni—W | Ni—W | Ni—W | Ni—P | Cr |
| Thickness µm | 1.5 | 34 | 20 | 30 | 30 |
| W Atom Weight Ratio (%) | 40 | 40 | 34 | — | — |
| Rotary Endurance Test (A) | C | B | C | C | C |
| Rotary Endurance Test (B) | A | B | A | A | A |
| Rotary Endurance Test (C) | C | B | C | C | C |
| Rotary Endurance Test (D) | A | B | A | A | A |
| Rotary Endurance Test (E) | C | B | C | C | C |
| Rotary Endurance Test (F) | A | B | A | A | A |

C. Ex.: Comparative Example

It can be seen from the above results that the rolling apparatuses of the present invention all were "pass" to both of hydrochloric acid and sodium hydroxide and showed an excellent corrosion resistance, while all the rolling apparatuses of the comparative examples except for the sample of Comparative Example 2a caused both the discolored surfaces and rotation rumbling in the point of the corrosion resistance to hydrochloric acid. The sample of Comparative Example 2a did not cause discolored surface but caused rotation rumbling.

With respect to the rolling apparatus of Comparative Example 1a having a Ni—W alloy film having a thickness lower than the lower limit of the present invention, the corrosion resistance to sodium hydroxide was "pass", but the surface was discolored and rotation rumbling occurred to a 12N hydrochloric acid solution due to the considerably thin thickness of the film. Thus, the sample was rated as "failure".

With respect to the rolling apparatus of Comparative Example 2a having a Ni—W alloy film thicker than the upper limit of the present invention, the corrosion was not observed to sodium hydroxide and hydrochloric acid, but the rolling apparatus, in which the rolling element(s) rolled while contacting with the first contact surface and the second contact surface, caused the rotation rumbling due to the excessive thickness of the film. Thus, the sample was rated as "failure".

With respect to the rolling apparatus of Comparative Example 3a in which the tungsten (W) atom weight ratio of the Ni—W alloy film was lower than the lower limit specified in the present invention, i.e., the nickel atom weight ratio was excessive, in particularly, the corrosion resistance to hydrochloric acid was insufficient. Thus, the sample was rated as "failure".

With respect to the rolling apparatus of Comparative Example 4a having a conventional nickel-phosphorus film, the film was dissolved in the hydrochloric acid solution, and the surface discoloration and rotation rumbling occurred. Thus, the sample was rated as "failure".

With respect to the rolling apparatus of Comparative Example 5a having a conventional chromium film, the film was dissolved in the hydrochloric solution as the sample of Comparative Example 4a, and the surface discoloration and rotation rumbling occurred. Thus, the sample was rated as "failure".

Next, rolling bearings as the rolling apparatus of the present invention were evaluated in terms of corrosion resistance, durability, and cost for production thereof, along with the comparative rolling bearings.

The bearings used are indicated in Table 3 to Table 5 below. That is, bearing 608 was used as the deep groom ball bearing, bearing FJ-810 was used as the needle bearing, and bearing NU 204 was used as the cylindrical rolling bearing.

1) Corrosion Resistance Test and Bearing Production Cost

Each test bearing was immersed in a corrosive solution for 24 hours at room temperature, and the corroded state of the surface of the test bearing was observed.

Criteria for Evaluation:
(1) Corrosion Test
  No corrosion: 0
  Slightly corroded: 1
  Intermediately corroded: 3
  Greatly corroded: 5
(2) Bearing Production Cost
  Small: A
  Intermediate: B
  Large: C Test was conducted using a deep groove ball bearing (the outer race and the inner race made of 440C stainless steel, rolling elements made of silicon nitride, silicon carbide or zirconia, and a cage made of a fluorine resin), and the conditions and results are shown in Table 3 below.

TABLE 3

|  | Example 1 | Example 2 | Example 3 | Example 4 |
|---|---|---|---|---|
| Thickness of Ni—W Alloy Film* (μm) | 5.0 | 5.0 | 5.0 | 5.0 |
| W Atom Weight Ratio (wt. %) | 40 | 40 | 40 | 40 |
| Rolling Element | Silicon nitride | Silicon nitride | Zirconia | Silicon carbide |
| Cage | Fluorine resin | Fluorine resin | Fluorine resin | Fluorine resin |

TABLE 3-continued

| Corrosive Solution | 12N HCl | 1N Hydrofluoric acid | 6N H$_2$SO$_4$ | 10N NaOH |
|---|---|---|---|---|
| Corrosion Resistance | 0 | 0 | 0 | 0 |
| Cost | A | A | A | A |

*: Ni—W alloy film formed on the outer race and inner race

|  | C. Ex. 1 | C. Ex. 2 | C. Ex. 3 |
|---|---|---|---|
| Outer Race and Inner Race | Stainless steel | Ni—P | Chromium |
| Thickness* (μm) | not formed | 10 | 10 |
| Rolling Elements | Silicon nitride | Silicon nitride | Silicon nitride |
| Cage | Fluorine resin | Fluorine resin | Fluorine resin |
| Corrosive Solution | 6N HCl | 6N HCl | 6N HCl |
| Corrosion Resistance | 5 | 3 | 3 |
| Cost | A | A | A |

C. Ex.: Comparative Example
*: Thickness of film

As the results, the samples of Examples 1 to 4 having a Ni—W alloy film according to the present invention all were excellent in the corrosion resistance as compared with the sample of Comparative Example 1 having an outer race and an inner race which were made of a stainless steel without being coated with the Ni—W alloy, and the samples of Comparative Examples 2 and 3 having a Ni—P film and a chromium film, respectively, each formed on an outer race and an inner race.

2) Durability Test of Bearing

The rotation test of each bearing was carried out in a 6N hydrochloric acid vapor atmosphere until the torque of the bearing raised.

Tested bearing: Deep groove ball bearing (608) having an inside diameter of 8 mm, needle bearing (FT-810), and cylindrical rolling (NU204) bearing, which are the same as used in the corrosion resistance test described above.

Rotation speed: 600 r.p.m.

Temperature: Room temperature

Atmosphere: In 6N hydrochloric acid vapor

Lubrication state: The lubricity only of the cage was utilized.

The durability test results of various bearings (the outer races and the inner races thereof were all made of the stainless steel 440C described above) are shown in Table 4 below.

TABLE 4

|  | Example 5 | Example 6 | Example 7 | Example 8 |
|---|---|---|---|---|
| Bearing | Deep groove ball bearing | Deep groove ball bearing | Needle Bearing | Cylindrical roller bearing |
| Thickness of Ni—W Alloy Film* (μm) | 5.0 | 5.0 | 5.0 | 5.0 |
| W atom Weight Ratio (wt. %) | 40 | 40 | 40 | 40 |
| Rolling Elements | Silicon nitride | Silicon carbide | Silicon nitrate | Silicon nitrate |
| Cage | Fluorine resin | Fluorine resin | Fluorine resin | Fluorine resin |

TABLE 4-continued

| | | | | |
|---|---|---|---|---|
| Bearing Radial Load (N) | 50 | 50 | 200 | 400 |
| Durable Time (h) of Bearing | 520 | 550 | 380 | 360 |

*: Ni—W alloy film formed on the outer race and inner race.

| | Example 9 | C. Ex. 4 | C. Ex. 5 |
|---|---|---|---|
| Bearing | Deep groove ball bearing | Deep groove ball bearing | Deep groove ball bearing |
| Thickness of Ni—W Alloy Film* (μm) | 5.0 | 5.0 | 5.0 |
| W Atom Weight Ratio (wt. %) | 40 | 40 | 40 |
| Rolling Elements | Ni—W 5 μm in thickness W-ratio 40% | Ni—W 5 μm in thickness W-ratio 40% | Silicon nitride |
| Cage | Fluorine resin | Nylon resin | Nylon resin |
| Bearing Radial Load (N) | 50 | 50 | 50 |
| Durable Time (h) of Bearing | 340 | 3 | 50 |

C. Ex.: Comparative Example
*: Ni—W alloy film formed on the outer race and inner race.

The bearings of Example 5 to 9 comprise rolling elements made of ceramic or provided with a Ni—W alloy film according to the present invention and a cage made of a fluorine resin. These bearings exhibited a long life with the transition film from the fluorine resin cage (to the surfaces of the outer race and the inner race and the surface of the rolling elements). On the other hand, the bearings of Comparative Examples 4 and 5 having a cage not made of a fluorine resin but of a nylon resin exhibited a very short durable life. That is, the combination of the outer race and the inner race each having the Ni—W alloy film according to the present invention with the cage made of a fluorine resin enables the bearing to have more prolonged rolling life even under a corrosive environment.

(3) Effects of Fluorine Grease on Durability of Bearing

As shown in Table 5 below, a fluorine resin grease or a lithium series grease was filled in the rolling bearings having an outer race, an inner race, rolling elements, each provided with the Ni—W alloy film, and a cage made of a fluorine resin or a steel having thereon a Ni—W alloy film. The rolling bearings were evaluated for durability, corrosion resistance, and cost. The obtained results are shown in Table 5 below.

TABLE 5

| | Example 10 | Example 11 | Example 12 | Example 13 |
|---|---|---|---|---|
| Thickness of Ni—W Film* (μm) | 2.0 | 30 | 5.0 | 5.0 |
| W-atom Weight Ratio (wt. %) | 40 | 40 | 35 | 43 |
| Cage | Fluorine resin | Fluorine resin | Fluorine resin | Steel with Ni—W Film** |
| Grease | Fluorine grease | Fluorine grease | Fluorine grease | Fluorine grease |
| Kind of Bearing | Deep groove ball bearing | Deep groove ball bearing | Cylindrical roller bearing | Needle bearing |

TABLE 5-continued

| | | | | |
|---|---|---|---|---|
| Durable Time (h) of Bearing | ≧600 | ≧600 | ≧600 | ≧600 |
| Corrosion Resistance | 0 | 0 | 0 | 0 |
| Cost | A | A | A | A |

| | C. Ex. 6 | C. Ex. 7 | C. Ex. 8 | C. Ex. 9 |
|---|---|---|---|---|
| Thickness of Ni—W Film* (μm) | 1.8 | 33 | 5.0 | 5.0 |
| W-atom Weight Ratio (wt. %) | 40 | 40 | 30 | 43 |
| Cage | Fluorine resin | Fluorine resin | Fluorine resin | Fluorine resin |
| Grease | Fluorine grease | Fluorine grease | Fluorine grease | Lithium grease |
| Kind of Bearing | Deep groove ball bearing | Deep groove ball bearing | Cylindrical roller bearing | Deep groove ball bearing |
| Durable Time (h) of Bearing | 250 | ≧600 | 300 | 85 |
| Corrosion Resistance | 5 | 0 | 3 | 0 |
| Cost | A | C | A | A |

C. Ex.: Comparative Example
*: Ni—W film formed on the outer race, inner race, and rolling elements.
**: The Ni—W film is the same as that provided on outer race, inner race and rolling elements.

It can be seen from the results shown in Table 5 that the bearings in which the Ni—W alloy film satisfying the conditions defined in this invention was coated on the inner race, the outer race, and the rolling elements, the cage was made of a fluorine resin, and further a fluorine grease was filled therein (Examples 10 to 13) showed a longer life value than those of the bearings of the present invention shown in Table 4 above. On the other hand, the comparative bearings in which the members constituting the bearing did not have the Ni—W film satisfying the conditions defined by the present invention or the grease filled therein was not a fluorine grease (Comparative Examples 6 to 9) were inferior in the durable life or the corrosion resistance or the cost thereof was high.

Thus, the rolling bearing in which the Ni—W alloy film satisfying the conditions defined in the present invention is applied, the cage is made of a fluorine resin, and further, a fluorine grease is enclosed therein as a lubricant oil is excellent in all the durable life, the corrosion resistance, and the cost.

Influence of Ni—W Alloy Film on Extent of Corrosion

The influence of the Ni—W alloy film on the extent of the corrosion was determined using the evaluation ranks 0 to 5 of the corrosion resistance test of the examples described above and the results are shown in FIG. 4.

As the test bearing, the deep groove ball bearing 608 was used, each of the Ni—W alloy films having various thicknesses was applied to the inner race and the outer race, silicon nitride was used for the rolling elements, and a fluorine resin was used for the cage. In this case, the tungsten atom weight ratio of the Ni—W alloy films applied to the inner race and the outer race was controlled to 40% by weight. In the corrosion condition, the sample was immersed in an aqueous 6N hydrochloric acid solution for 24 hours. Then, the corroded state of the surface of the test bearing was observed to evaluate the corrosive extent.

Figure 4:
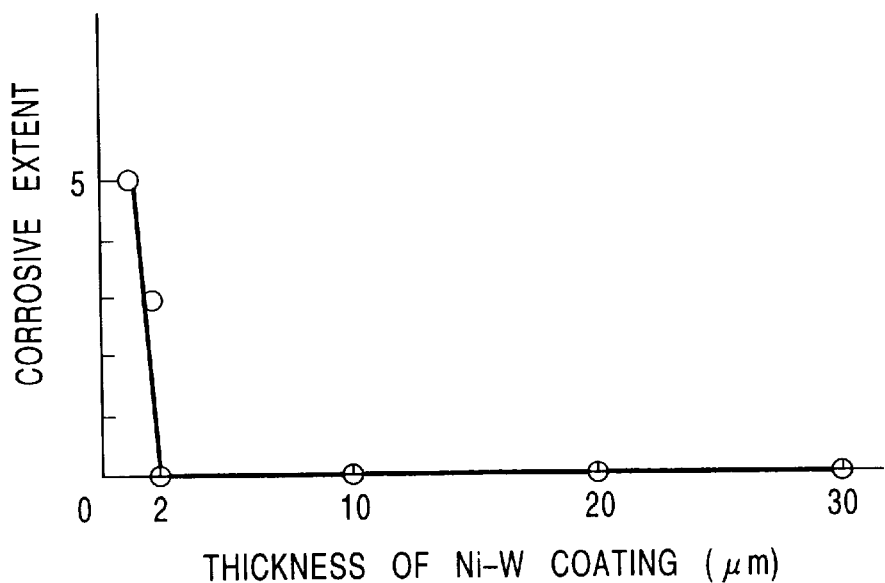
FIG. 4 is a graph showing the relation of the thickness of the Ni—W alloy film and the corrosion extent.

It can be seen from FIG. 4 that when the thickness of the Ni—W alloy film is thinner than 2 μm, the inner race and the outer race are corroded by the influence of the pinholes formed. On the other hand, in the case of applying the Ni—W alloy film having a thickness of 2 μm or thicker, the bearing is not corroded owing to the corrosion resistance of the Ni—W alloy film.

Figure 5:
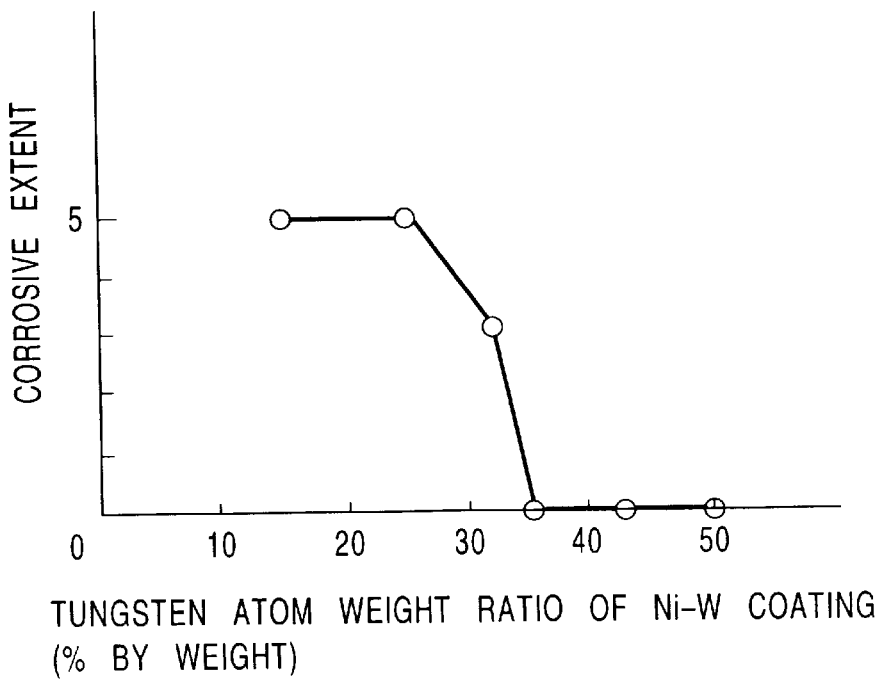
FIG. 5 is a graph showing the relation of the tungsten atom weight ratio of the Ni—W alloy film and the corrosion extent.

Next, the influence of the tungsten atom weight ratio in the Ni—W alloy film on the extent of corrosion was determined and the results are shown in FIG. 5.

The condition of the test bearing and the condition of corrosion were the same as those in the case of determining the relation of FIG. 4. The thickness of the Ni—W alloy film applied to the inner race and the outer race was fixed to 5 μm.

As is clear from FIG. 5, because the tungsten atom weight ratio in the Ni—W alloy film applied to the inner and outer races is less than 35% by weight, the film is hard to become complete amorphous, the corrosion resistance of the film is not improved and the test bearing is corroded. On the other hand, when the tungsten atom weight ratio of the Ni—W alloy film is 35% by weight or more, the Ni—W alloy film becomes amorphous, whereby the bearing is not corroded.

The test was stopped at a tungsten atom weight ratio of 50% by weight, which is a limiting value for the techniques existing at present, but it can be clearly consumed that when the tungsten atom weight ratio is more than 50% by weight, the film will have a good corrosion resistance.

Figure 6:
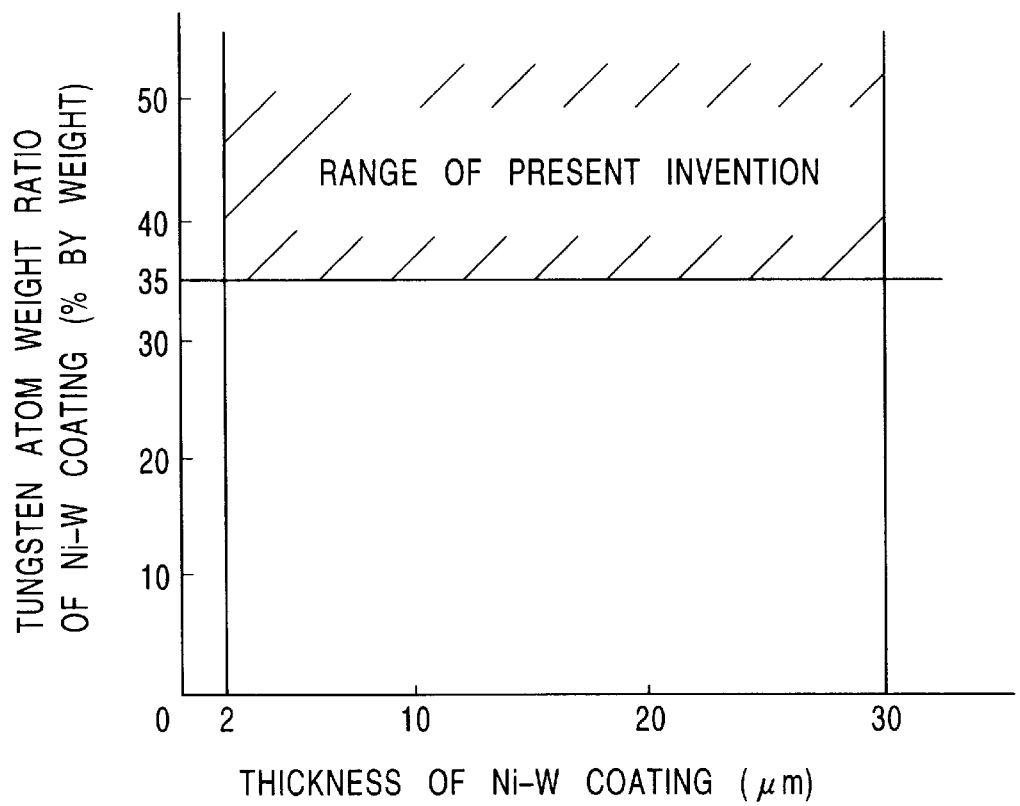
FIG. 6 is a graph showing the relation of the thickness of the Ni—W film and the tungsten atom weight ratio for showing the range of the present invention.

Based on the results of FIG. 4 and FIG. 5, the relation of the thickness (μm) of the Ni—W alloy film and the tungsten atom weight ratio in the film giving influences on the corrosion resistance was determined and the results are shown in FIG. 6. As shown in FIG. 6, the ranges of the present invention wherein the thickness of the Ni—W alloy film is in the range of from 2 to 30 μm and the tungsten atom weight ratio is in the range of at least 35% by weight give a good corrosion resistance.

Besides the Ni—W film described above, a rhodium film is also effective in the corrosion resistance. The effects of the rhodium film on the corrosion resistance were evaluated paying attention to the relation between the thickness of the rhodium film v.s. the extent of the corrosion as follows.

As the rolling apparatus, rolling bearings (#6000, outer race and inner race being made of SUS440C and having a rhodium film each having a different thickness) were immersed in 12N hydrochloric acid, 1N hydrofluoric acid, 6N sulfuric acid, and 10N sodium hydroxide as corrosive solutions for 24 hours. The corroded state of the surface of the outer race and inner race was observed and evaluated in the same manner as in the corrosion resistance test described above. With respect to all these corrosive solutions, the results shown in FIG. 7 were obtained.

Figure 7:
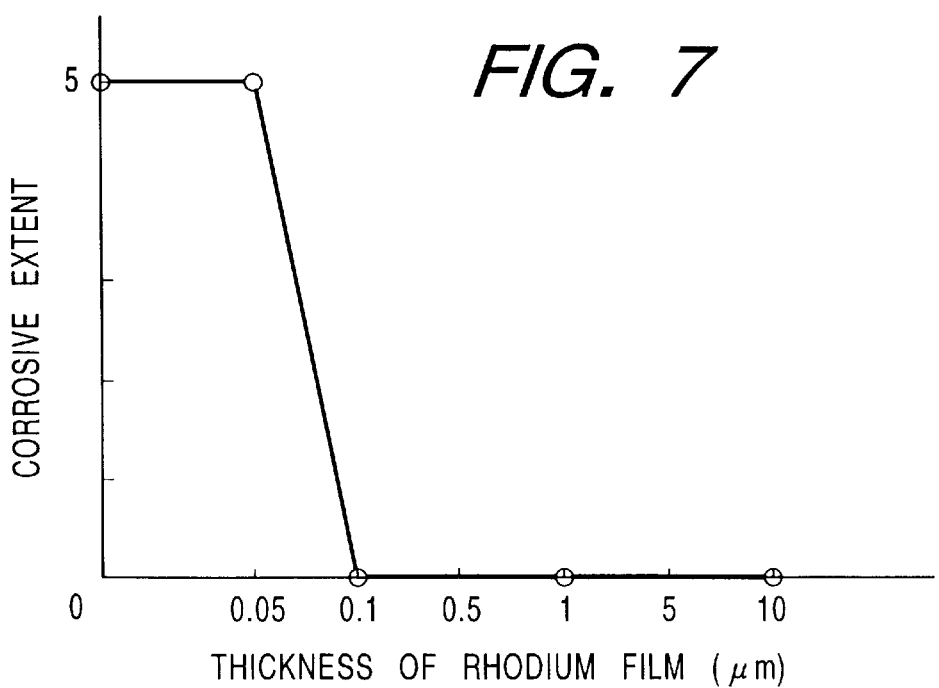
FIG. 7 is a graph showing the relation of the thickness of the rhodium film and the corrosion extent.

It can be seen from the results shown in FIG. 7 that the rhodium films having a thickness falling within the range of 0.1 to 10 μm were effective in the corrosion resistance, while the rhodium film having a thickness of less than 0.1 μm resulted in considerably corroded surface.

It is apparent that the above results applies to other rolling apparatuses such as a linear guide or a ball screw, though the above test was effected using a rolling bearing.

As described above, the effect of providing a rolling apparatus and a rolling bearing each having a corrosion resistance of a very high reliance even under a severe environment, for example, in which a strong acid is present, can be obtained by forming the nickel-tungsten alloy film having a high hardness and a wear resistance, as well as excellent resistance to an acid and an alkali according to the present invention.

Also, by regulating the thickness of the nickel-tungsten alloy film in the range of from 2 to 30 μm, the formation of pinholes, which may be caused by the excessively thin thickness of the film, can be prevented, whereby the corrosion of the base metal can be completely prevented, and lowering of the dimensional precision, which may be caused by the excessively thick thickness of the film, does not occur, whereby re-working of ensuring the precision is unnecessary and the production cost can be reduced.

Furthermore, because the tungsten atom weight ratio of the nickel-tungsten alloy film is at least 35% by weight, the amorphous nickel-tungsten alloy film can be formed to improve the corrosion resistance, lowering of the corrosion resistance to a strong acid, which may caused by the excessive ratio of the nickel component, can be prevented, and a rolling apparatus having a long life and a corrosion resistance, which shows a stable function even under a strong acid environment, in particular, under a hydrochloric acid environment, can be provided.

Also, in the rolling bearing of the present invention, because the rolling elements made of silicon nitride, silicon carbide or zirconia differs from the inner race or the outer race in material, the rolling elements are hard to be worn and the life can be improved. The use of a cage made of a fluorine resin can improve the life of the bearing, since the fluorine resin acts as a solid lubricant even under a corrosive environment. Furthermore, the durability of the bearing can be improved and the reliance of the life of the bearing can be increased by enclosing a grease for corrosion resistance in the bearing.

The rhodium film having a thickness of 0.1 to 10 μm is effective in the corrosion resistance as well.

Thus, the present invention can provide a rolling bearing having a corrosion resistance of a long life, which shows a stable function under a corrosive environment, in particular, a hydrochloric acid environment.

While the invention has been described in detail and with reference to specific embodiments thereof, it will be apparent to one skilled in the art that various changes and modifications can be made therein without departing from the spirit and scope thereof.

What is claimed is:

1. A rolling apparatus comprising rolling elements disposed between an outer member and an inner member, the rolling elements rolling along a first contact surface, which is the contact surface of the outer member with the rolling elements, and along a second contact surface, which is the contact surface of the inner member with the rolling elements, wherein a film composed of a nickel-tungsten alloy is formed on at least one of the rolling elements, the first contact surface and the second contact surface, and the film has a thickness of from 2 to 30 μm and a tungsten atom weight ratio of at least 35% by weight.

2. The rolling apparatus of claim 1, wherein the rolling apparatus is a rolling bearing comprising an outer race, an inner race, rolling elements, and a cage, wherein the rolling elements are made of ceramics and the cage is made of a material containing a fluorine resin.

3. The rolling apparatus of claim 1, wherein the rolling apparatus is a rolling bearing comprising an outer race, an inner race, rolling elements, and a cage, wherein a grease having a corrosion resistance is enclosed in the bearing.

* * * * *